United States Patent
Pippes et al.

(10) Patent No.: US 12,276,290 B2
(45) Date of Patent: Apr. 15, 2025

(54) HYDRAULIC UNIT

(71) Applicants: HYDRAULIK NORD TECHNOLOGIES GMBH, Parchim (DE); ECKERLE TECHNOLOGIES GMBH, Malsch (DE)

(72) Inventors: Thomas Pippes, Pinnow (DE); Artur Bohr, Waldenbuch (DE)

(73) Assignees: HYDRAULIK NORD TECHNOLOGIES GMBH, Parchim (DE); ECKERLE TECHNOLOGIES GMBH, Malsch (DE)

( * ) Notice: Subject to any disclaimer, the term of this patent is extended or adjusted under 35 U.S.C. 154(b) by 0 days.

(21) Appl. No.: 18/580,875

(22) PCT Filed: Jul. 15, 2022

(86) PCT No.: PCT/EP2022/069922
§ 371 (c)(1),
(2) Date: Jan. 19, 2024

(87) PCT Pub. No.: WO2023/006454
PCT Pub. Date: Feb. 2, 2023

(65) Prior Publication Data
US 2024/0344537 A1    Oct. 17, 2024

(30) Foreign Application Priority Data
Jul. 27, 2021   (DE) .................... 10 2021 119 466.0

(51) Int. Cl.
*F15B 1/04*   (2006.01)
*F15B 13/04*   (2006.01)
*F15B 15/18*   (2006.01)

(52) U.S. Cl.
CPC ............... *F15B 15/18* (2013.01); *F15B 1/04* (2013.01); *F15B 13/0401* (2013.01)

(58) Field of Classification Search
CPC ........ F15B 15/18; F15B 13/0401; F15B 1/04; F15B 15/149
See application file for complete search history.

(56) References Cited

U.S. PATENT DOCUMENTS 8,448,432 B2 *  5/2013  Bresie .................... F15B 7/006
                                                              92/113
2020/0132209 A1 *  4/2020  Orino .................... F15B 1/033

FOREIGN PATENT DOCUMENTS

CN        111852982 A   * 10/2020
DE        1 97 44 599 A1   4/1999
(Continued)

OTHER PUBLICATIONS

English Translation of International Search Report dated Sep. 21, 2022, in connection with PCT Application No. PCT/EP2022/069922.

(Continued)

*Primary Examiner* — Abiy Teka
(74) *Attorney, Agent, or Firm* — Norris McLaughlin, P.A.

(57) ABSTRACT

A hydraulic unit (10) for providing a pressurized hydraulic fluid for driving a coupled hydraulic actuator (12), comprising a motor (30) arranged in a motor housing (28), a hydraulic accumulator (40) arranged in an accumulator housing, a hydraulic pump (36) arranged in a hydraulic housing and a hydraulic block (38), wherein the motor housing (28), the accumulator housing and the hydraulic housing are fluidically connected to one another. It is provided that at least one main flow connection between the hydraulic pump (36) and the actuator (12) is guided through at least one channel (44) of the motor housing (28).

14 Claims, 2 Drawing Sheets

(56) References Cited

FOREIGN PATENT DOCUMENTS

Figure 1:
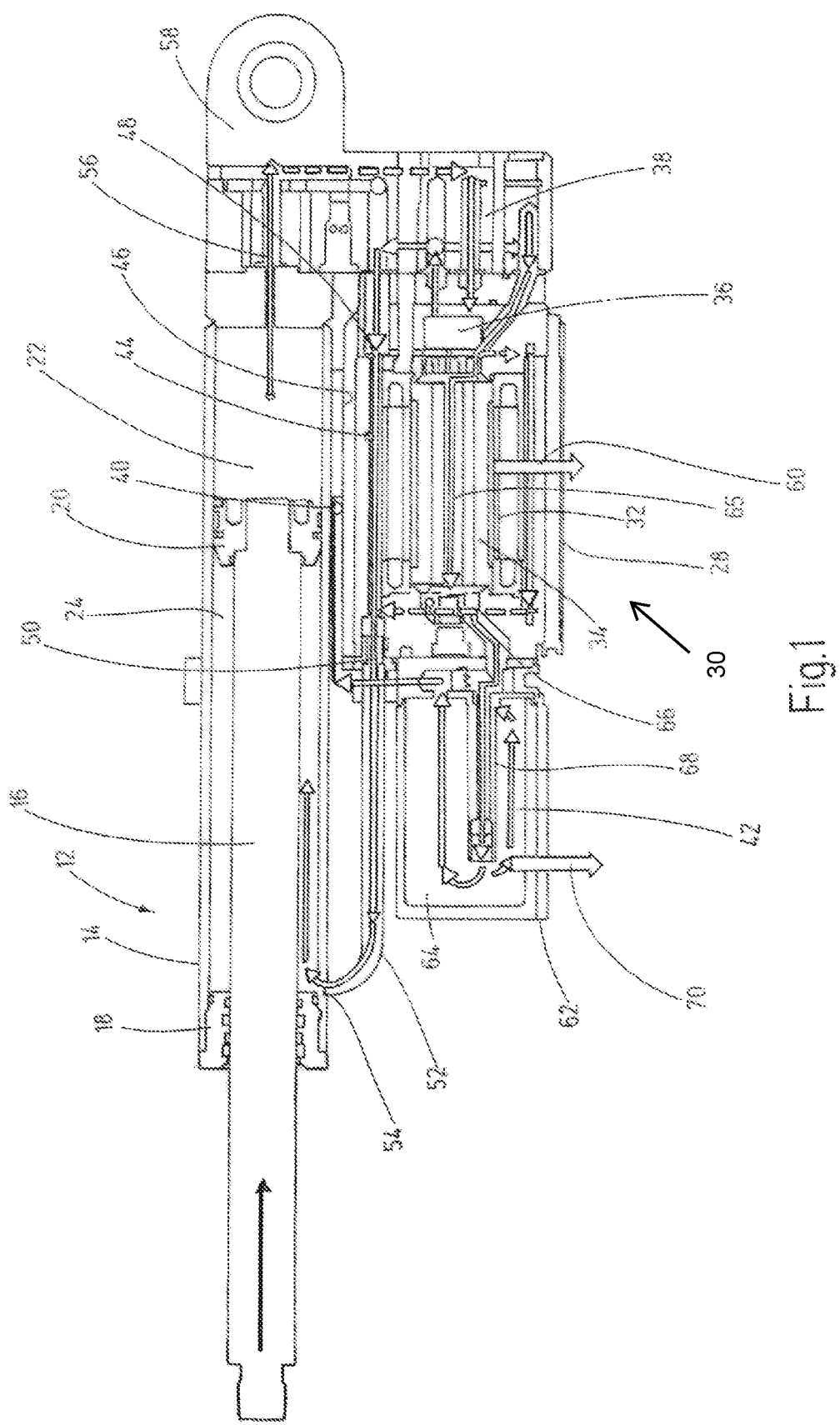

| | | |
|---|---|---|
| EP | 0 819 852 A2 | 1/1998 |
| EP | 1 158 181 A2 | 11/2001 |
| EP | 2 128 446 B1 | 4/2017 |

OTHER PUBLICATIONS

International Search Report dated Sep. 21, 2022, in connection with PCT Application No. PCT/EP2022/069922.
Written Opinion in connection with PCT Application No. PCT/EP2022/069922.

* cited by examiner

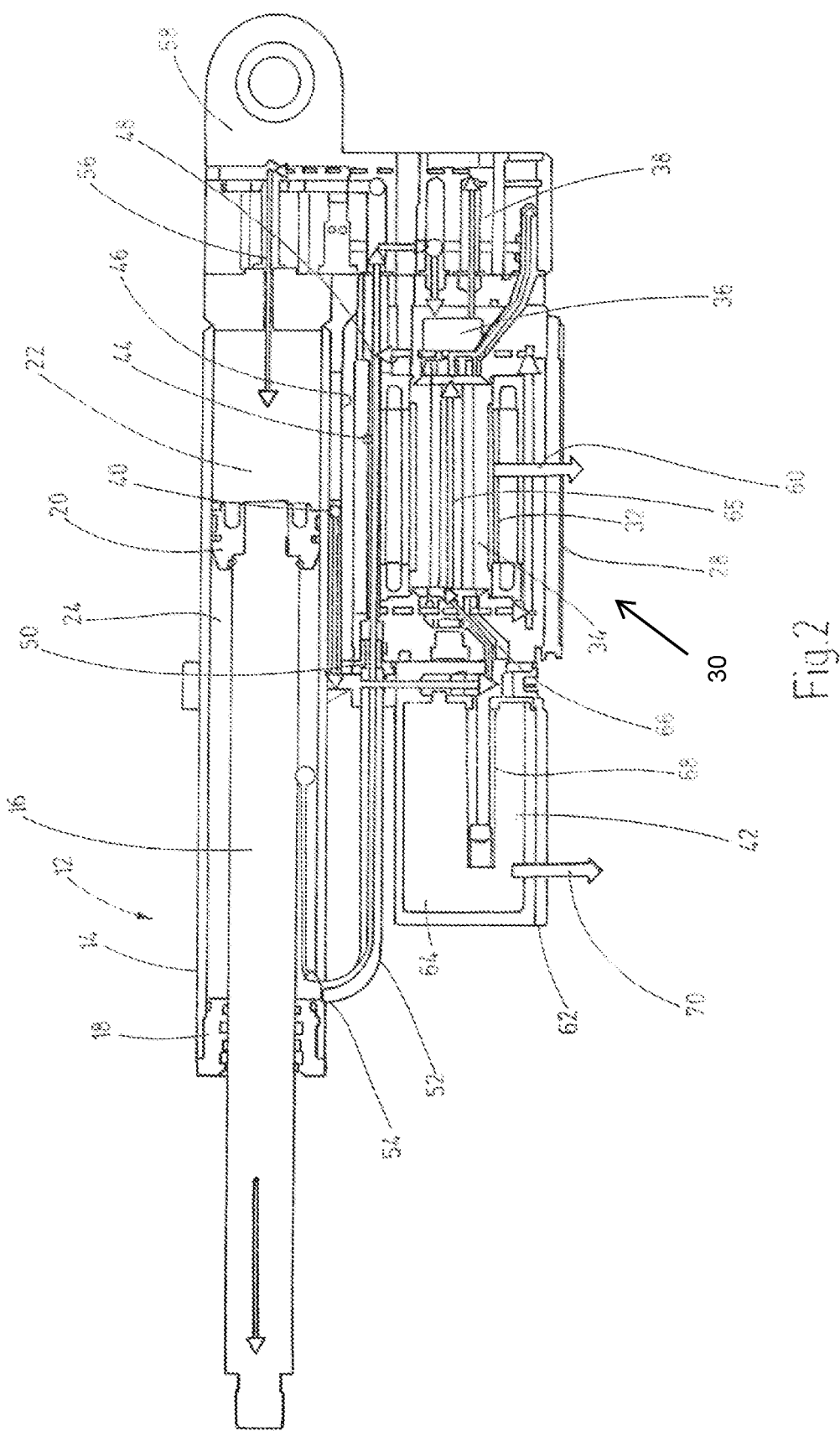

HYDRAULIC UNIT

This application is the U.S. National Stage of International Application No. PCT/EP2022/069922, filed Jul. 15, 2022, which claims foreign priority benefit under 35 U.S.C. § 119 of German Patent Application Nos. 10 2021 119 466.0, filed Jul. 27, 2021, the disclosures of which are incorporated herein by reference.

The invention relates to a hydraulic unit for providing a pressurized hydraulic fluid for driving a coupled hydraulic actuator.

A generic type of hydraulic unit is known.

For instance, EP 2 128 446 B1 discloses a hydraulic unit with a motor arranged in a motor housing, a hydraulic accumulator arranged in an accumulator housing, a hydraulic pump arranged in a pump housing and a hydraulic block. These form a rigid module which is able to be handled uniformly, wherein hydraulic fluid circulating in the module passes through all elements of the module in longitudinal direction in certain sections. The hydraulic fluid circulating in the module is an accumulator volume flow which can circulate between the hydraulic accumulator and the hydraulic pump. A main flow connection is guided past the hydraulic unit between the hydraulic block and the hydraulic actuator.

The invention is based on the problem of creating a generic type of hydraulic unit, which has a compact structure and allows improved cooling of the motor.

According to the invention, this problem is solved by a hydraulic unit having the features given in Claim 1. The fact that at least one main flow connection between the hydraulic pump and the actuator, which is able to be subjected to high pressure, is guided through at least one channel of the motor, makes it possible advantageously to achieve a very effective cooling of the motor by the flow of the pump main volume flow through the channel of the main flow connection in the motor. In this way there is maximum heat transfer between the motor components of the motor and the housing. The heat can then be dissipated effectively to the external environment via the housing. Within the scope of the invention, high pressure is defined as load pressure or working pressure of the hydraulic pump for pressurizing the actuator.

In a preferred embodiment of the invention it is provided that the main flow connection through the motor is a forward flow or a return flow. In this way it is advantageously achieved that, depending on the control of the hydraulic actuator coupled to the hydraulic unit, the greatest possible volume flow is guided through the motor. This also enables the greatest possible dissipation of heat from the motor and thus the cooling of the motor components.

In a further preferred embodiment of the invention it is provided that the main flow connection is the forward flow or return flow depending on the direction of rotation of the hydraulic pump. Advantageously, this makes it possible for one and the same channel of the main flow connection, which is able to be subjected to high pressure, to be switched by the motor to forward flow or return flow depending on the direction of rotation of the hydraulic pump. In this way it is ensured in any case that the greatest possible volume flows through the motor and is available for cooling the motor components.

In a further preferred embodiment of the invention it is provided that the hydraulic pump is a pump that is able to be operated in a four-quadrant mode which allows delivery and recovery in two directions. This makes it advantageous to combine the hydraulic unit with a four-quadrant hydraulic pump, which is known per se, by which the flow direction of the main volume flow can then be changed in a simple manner according to the direction of rotation. This results in a very advantageous combination of the channel of the main flow connection in the motor, which can be used for forward flow or return flow.

According to the invention, it is preferably provided that the at least one channel is directed through a motor housing of the motor. This makes it easy to integrate the at least one channel and achieve particularly effective heat dissipation.

In a further preferred embodiment of the invention it is provided that the at least one channel of the motor housing for the main power connection comprises a wall that comes into direct contact with the outside of the motor housing. This makes it possible, in a particularly advantageous manner, for the heat of the motor components to dissipate via the medium of the hydraulic fluid to the outside of the motor housing and thus into the environment.

Furthermore, in a preferred embodiment of the invention, it is provided that the at least one channel is guided through the motor housing in a meandering and/or spiral manner. In this way, very advantageously, the greatest possible contact area is obtained between the medium of the hydraulic fluid and the motor housing. The heat dissipation is thereby particularly effective. The heat flow is evenly distributed over the entire surface of the motor housing in order to avoid hot spots on the motor and thermal stresses as a result of uneven temperature distribution.

In a preferred embodiment of the invention it is further provided that power electronics for controlling the motor can also be cooled by the main volume flow. For this purpose, the power electronics can be directly coupled to the motor housing cooled by the main volume flow in a thermally conductive manner. It is also conceivable to direct the main volume flow directly through corresponding channels provided in a housing of the power electronics. This is particularly advantageous if the power electronics cannot be arranged directly on the motor housing for structural reasons.

In addition, in a further preferred embodiment of the invention, it is provided that an accumulator volume flow between an accumulator housing and the hydraulic pump is guided through a channel of the motor which is separate from the main volume flow. This allows the accumulator volume flow to be used for additional cooling of the motor components.

It is provided preferably that the channel for the accumulator volume flow is directed through a rotor shaft of the motor, which is preferably in the form of a hollow shaft. This enables a fluid connection to be created directly for an accumulator volume flow.

Furthermore, in a preferred embodiment of the invention it is provided that the hydraulic accumulator comprises an intermediate chamber which is flange-mounted onto the motor housing or is formed with the latter, which has a large surface area to the environment. In this way, further improved heat dissipation into the environment can be achieved via the intermediate chamber by forced convection on the surface.

Furthermore, according to the invention it is provided that the accumulator volume flow flows through the intermediate chamber between the motor and accumulator in only one direction, depending on the accumulator volume direction, via a non-return valve. This advantageously makes optimum use of the intermediate chamber for heat dissipation to the environment.

Further preferred configurations of the invention are given in the remaining features set out in the dependent claims.

The invention is explained in more detail in the following by way of an exemplary embodiment with reference to the associated drawings,
in which:

FIG. 1 shows a hydraulic unit according to the invention in a first switching state and FIG. 2 shows the hydraulic unit according to the invention in a second switching state.

FIG. 1 shows a schematic cross-sectional view of a hydraulic unit denoted as a whole by the number 10. This is used to supply a hydraulic actuator 12 with a pressurized hydraulic fluid. The actuator 12 has a housing 14 inside which a piston 16 is able to be linearly displaced. The piston 16 is guided in a sealing manner in the housing 14 via a seal 18. A sealing element 20 connected to the piston 16 divides the housing 14 into two separate chambers 22 and 24. Depending on the pressure difference between the chambers 22 and 24 the piston 16 is moved out of or into the housing 14. In this way it is possible to perform a travel motion with the piston 16. The actual position of the piston 16 is able to be determined by a position sensor.

The structure and mode of operation of such an actuator 12 are known in principle.

The structure and function of the hydraulic unit 10 according to the invention for controlling the actuator 12 are described in more detail below.

The hydraulic unit 10 comprises a motor 30 arranged in a motor housing 28 which has a stator 32 and a rotor 34.

The motor 30 is operatively connected to a hydraulic pump 36. The hydraulic pump 36 is formed as a pump that is able to be operated in four-quadrant mode. A hydraulic block 38 is connected to the side of the hydraulic pump 36 facing away from the motor 30, inside which hydraulic block, valves, not shown in detail here, are used to control a volume flow of hydraulic fluid generated by the hydraulic pump 36.

The structure and function of the motor 30 with an operatively connected hydraulic pump 36 and coupled hydraulic block 38 are also known in principle to the person skilled in the art, so that this is not discussed in detail in the description of the present invention.

The hydraulic unit 10 is also associated with a hydraulic accumulator 40, which comprises an intermediate chamber 42, which is flange-mounted on the motor housing 28 or is formed with the latter.

The actuator 12, motor housing 28, hydraulic pump 36, hydraulic block 38 and accumulator 40 are connected to one another fluidically in the manner described in the following.

At least one channel 44, which forms a main flow connection for the main volume flow of the hydraulic pump 36 to the actuator 12, is guided through the motor housing 28.

The channel 44 is formed inside the motor housing 28 so that it is arranged close to an outer casing 46 of the motor housing 28. An inner wall of the channel 44 is thus directly adjacent to the outer wall 46 of the motor housing 28.

The channel 44 can be formed to be branched inside the motor housing 28. The latter can extend along the motor housing 28 in a meandering and/or spiral manner in its longitudinal direction. It can also be formed to be branched so that a plurality of subchannels of the channel 44 extend in parallel around the circumference of the motor housing 28. In each case the channel 44 has an inlet side 48 facing the hydraulic pump 36 and an outlet side 50 at its opposite end.

A connecting piece 52 extends from the outlet 50 to an inlet 54 into the chamber 24 of the actuator 12.

The chamber 22 of the actuator 12 is connected to the hydraulic pump 36 via a connection 56. The connection 56 is guided through the hydraulic block 38 and a fastening portion 58. The fastening portion 58 is used for mechanically fastening the entire device consisting of hydraulic unit 10 and actuator 12.

Both the channel 44 with connecting piece 52 and the connection 56 form main flow connections for a main volume flow of the hydraulic pump 36.

Depending on the operating mode of the hydraulic pump 36, i.e. depending on the direction of rotation, the channel 44 is a forward flow and the connection 56 is a return flow of the hydraulic unit 10. When the direction of rotation of the hydraulic pump 36 is reversed, the channel 44 is the return flow and the connection 56 is the forward flow.

FIG. 1 shows a switching state of the hydraulic unit 10, in which the piston 16 is retracted into the housing 14 of the actuator 12. This means that there is higher pressure in the chamber 24 of the housing 14 than in the chamber 22. The channel 44 with its connecting piece 52 is the forward flow for the hydraulic unit 10 in this switching state. The hydraulic fluid present in the chamber 22 is displaced and transferred via the connection 56 into the hydraulic unit 10. The connection 56 is thus the return flow of the hydraulic unit 10 in this switching state.

This is indicated by the arrow directions of the main volume flow of the hydraulic fluid.

The main volume flow of the hydraulic pump 36 which is guided through the channel 44 (or the system of channels 44) in the motor housing 28, contributes to an effective and maximum cooling of the motor 30 by absorbing the heat emitted by the motor 30 and releasing it to the environment via the external circumference of the motor housing 28. This is indicated by a heat arrow 60 in the region of the motor housing 28.

The hydraulic unit 10 is also associated with the hydraulic accumulator 40, into which the hydraulic fluid is returned. As the hydraulic fluid is displaced into the housing 14 of the actuator 12 (according to the retraction position in FIG. 1 from the chamber 22), it has to be returned back to the hydraulic accumulator 40, from which the hydraulic pump 36 then builds up the pressure for the forward flow of the main volume flow.

The intermediate chamber 42 is associated with the hydraulic accumulator 40. This is formed by a cavity 64 formed inside a housing 62.

Inside the motor 30 this storage volume flow (return of hydraulic fluid) is guided through a rotor shaft 65 of the rotor 34. For this purpose, this rotor shaft is formed as a hollow shaft. An intermediate channel 66 between the rotor shaft (hollow shaft) 65 opens into the intermediate chamber 42. The intermediate chamber 42 has a lance-like guide 68, which results in the storage volume flow inside the cavity 64 of the intermediate chamber 42 receiving a predetermined forced guidance. The storage volume flow is thus swirled inside the intermediate chamber 42 and guided along the housing of the intermediate chamber 42. This results in an improved heat dissipation through forced convection on the relatively large available surface of the inner wall of the intermediate chamber 42 via the housing 62 to the environment. This is indicated by a heat dissipation arrow 70.

The connecting piece 52 between the channel 44 and the housing 14 is guided on the outer casing of the intermediate chamber 42.

A control device, not shown in more detail, which can be used to control the motor 30 and thus the delivery rate of the hydraulic pump 36, is associated with the hydraulic unit 10.

The position sensor is connected to the control device via signal lines. Furthermore, the hydraulic block 38 can comprise electrically controllable valves, which are also connected to the control device by regulation and/or control technology.

All in all, the configuration of the hydraulic unit 10 according to the invention enables effective and maximum heat dissipation so that the engine 30 can be cooled to an optimal degree.

According to a further exemplary embodiment, not shown, the main volume flow can also be guided directly through the interior of the motor 30, for example, axially through a motor air gap and/or through bores, recesses or grooves in the rotor and/or stator laminated core.

FIG. 2 shows a switching state of the hydraulic unit 10, in which the piston 16 of the actuator 12 is extended out of the housing 14.

The same parts as in FIG. 1 are denoted by the same reference signs and not explained again.

In contrast to FIG. 1, FIG. 2 clearly shows the reverse flow direction of the main volume flow and the accumulator volume flow through the hydraulic unit 10. In this switching state, the main flow connection (here a return flow) is guided between the actuator 12 and hydraulic pump 36 through the motor housing 28.

It is not shown that the accumulator volume flow only flows in one direction via a non-return valve through the intermediate chamber between the motor and accumulator, depending on the direction of the accumulator flow, as shown in FIG. 1 for example.

According to an exemplary embodiment not shown, it can also be provided that the motor is formed with the motor housing as a separate component, which means that the motor is not connected directly to the hydraulic pump and/or the intermediate accumulator and/or the hydraulic block and/or the power electronics. The channel of the main flow connection for cooling the motor is also guided through the motor housing in these embodiment variants.

REFERENCE SIGNS

10 hydraulic unit
12 hydraulic actuator
14 housing
16 piston
18 seal
20 sealing element
22 chamber
24 chamber
28 motor housing
30 motor
32 stator
34 rotor
36 hydraulic pump
38 hydraulic block
40 hydraulic accumulator
42 intermediate chamber
44 channel
46 outer casing, outer wall
48 inlet side
50 outlet side
52 connecting piece
54 inlet
56 connection
58 fastening portion
60 heat arrow
62 housing
64 cavity
65 rotor shaft
66 intermediate channel
68 lance-like guide
70 heat dissipation arrow

The invention claimed is:

1. A hydraulic unit for providing a pressurized hydraulic fluid, comprising a motor arranged in a motor housing and a hydraulic pump arranged in a hydraulic housing, wherein the motor housing and the hydraulic housing are fluidically connected to one another,
wherein
at least one main flow connection, which is able to be subjected to high pressure, is guided between the hydraulic pump and an actuator through at least one first channel of the motor, and
at least one channel, which is able to be subjected to high pressure, for a main volume flow is guided through a stator of the motor.

2. The hydraulic unit of claim 1,
wherein
the at least one first channel is guided through the motor housing.

3. The hydraulic unit of claim 1, wherein
the at least one main flow connection through the motor is a forward flow.

4. The hydraulic unit of claim 1, wherein
the at least one main flow connection through the motor is a return flow.

5. The hydraulic unit of claim 1, wherein
the at least one main flow connection through the motor is a forward flow or a return flow depending on a direction of rotation of the hydraulic pump.

6. The hydraulic unit of claim 1, wherein
the hydraulic pump is a pump which is able to be operated in four quadrant mode, which permits delivery and recovery in both directions of rotation of the hydraulic pump.

7. The hydraulic unit of claim 1, wherein
the at least one first channel of the motor housing comprises a wall coming into direct contact with the outside of the motor housing.

8. The hydraulic unit of claim 1, wherein
the at least one first channel is guided in a meandering and/or spiral manner through the motor housing.

9. The hydraulic unit of claim 1, wherein
a housing for power electronics of the motor is also flowed through by the main volume flow in a separate channel that is able to be subjected to high pressure.

10. The hydraulic unit of claim 1, wherein
an accumulator volume flow between an accumulator housing and the hydraulic pump is guided through the motor through an intermediate channel separate from the main volume flow.

11. The hydraulic unit of claim 10,
wherein
the channel for the accumulator volume flow is guided through a rotor shaft of the motor.

12. The hydraulic unit of claim 1, wherein
the main volume flow is guided through a rotor chamber and/or a rotor shaft of the motor and a storage volume flow is guided through the motor housing in a meandering and/or spiral manner.

13. The hydraulic unit of claim 1, further comprising a hydraulic accumulator having an intermediate chamber which has a large surface area facing an environment.

14. The hydraulic unit of claim 13, wherein
a storage volume flow flows through an intermediate chamber between the motor and the hydraulic accumulator in one direction via a non-return valve, depending on the direction of an accumulator volume flow.

* * * * *